(12) United States Patent
Fanning

(10) Patent No.: US 6,918,060 B2
(45) Date of Patent: *Jul. 12, 2005

(54) BOUNDING DATA TRANSMISSION LATENCY BASED UPON LINK LOADING AND ARRANGEMENT

(75) Inventor: Blaise B. Fanning, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 547 days.

This patent is subject to a terminal disclaimer.

(21) Appl. No.: 09/999,584

(22) Filed: Oct. 31, 2001

(65) Prior Publication Data

US 2003/0081558 A1 May 1, 2003

(51) Int. Cl.⁷ ................................................. G06F 11/00
(52) U.S. Cl. .......................................... 714/37; 714/43
(58) Field of Search ............................... 714/4, 37, 39, 714/43

(56) References Cited

U.S. PATENT DOCUMENTS

| | | | |
|---|---|---|---|
| 5,758,053 A | * 5/1998 | Takeuchi et al. ................ 714/4 |
| 5,802,263 A | * 9/1998 | Dittmar et al. ................. 714/4 |
| 6,330,639 B1 | 12/2001 | Fanning |
| 6,438,707 B1 | * 8/2002 | Ronstrom .................... 714/13 |
| 6,467,031 B1 | 10/2002 | Fanning |
| 6,496,894 B1 | 12/2002 | Fanning |
| 6,523,092 B1 | 2/2003 | Fanning |
| 6,604,186 B1 | 8/2003 | Fanning |
| 6,615,308 B1 | 9/2003 | Fanning |
| 6,625,695 B2 | 9/2003 | Fanning |
| 6,631,476 B1 | * 10/2003 | Vandesteeg et al. ........... 714/4 |
| 6,640,312 B1 | * 10/2003 | Thomson et al. .............. 714/5 |
| 6,650,586 B1 | 11/2003 | Fanning |
| 6,684,311 B2 | 1/2004 | Fanning |
| 6,701,459 B2 | * 3/2004 | Ramanathan et al. ......... 714/37 |
| 6,701,469 B1 | 3/2004 | Matter et al. |
| 2002/0007468 A1 | * 1/2002 | Kampe et al. ................. 714/4 |
| 2002/0069352 A1 | 6/2002 | Fanning |
| 2003/0084029 A1 | * 5/2003 | Fanning ........................ 707/3 |
| 2003/0135682 A1 | 7/2003 | Fanning |
| 2003/0145134 A1 | 7/2003 | Wehage et al. |
| 2003/0158992 A1 | 8/2003 | Ajanovic et al. |

OTHER PUBLICATIONS

Rohit Chhabra, Intel Communication Group, Intel Corporation; Why Build Products Based on Third Generation I/O Architecture?; Copyright 2001, Compaq Computer Corp., Dell Computer Corp., Intel Corp., International Business Machines Corp., Microsoft Corp.; No. of pages –2.

Ajay V. Bhatt, Technology & Research Labs, Intel Corporation; Creating a Third Generation I/O Interconnect; Copyright 2001, Compaq Computer Corp., Dell Computer Corp., Intel Corp., International Business Machines Corp., Microsoft Corp.; pp.–1–8.

Ajay V. Bhatt, Creating a Third Generation IO Bus; Intel Developer Forum Fall 2001; Intel Labs; Aug. 27–30, 2001, pp. 1–29.

Gerald Holzhammer, Creating a Third Generation I/O Bus; Intel Developer UPDATE Magazine; Sep. 2001; pp. 1–5.

Abandoned U.S. Appl. No. 09/467,106, filed on Dec. 10, 1999; entitled Method and Apparatus for Peripheral Component Interface Bus Speed Selection.

* cited by examiner

Primary Examiner—Nadeem Iqbal
Assistant Examiner—Timothy M. Bonura
(74) Attorney, Agent, or Firm—Jeffrey B. Huter

(57) ABSTRACT

A method, apparatus, system, and machine-readable medium to bound data transmission latency by transmitting error verification data at a point during a data transmission based upon loading of a channel for the data transmission is provided. Embodiments may comprise determining the loading of a communication channel and transmitting error verification data to a target device based upon the loading. More specifically, some embodiments transmit error verification data at intervals, variable intervals in some embodiments, to balance transmission latency against the bandwidth available from a communication medium.

24 Claims, 4 Drawing Sheets

BOUNDING DATA TRANSMISSION LATENCY BASED UPON LINK LOADING AND ARRANGEMENT

FIELD OF INVENTION

The present invention is in the field of data transmission. More particularly, the present invention provides a method, apparatus, system, and machine-readable medium to bound data transmission latency by transmitting error verification data at a point during a data transmission based upon loading of a channel for the data transmission.

BACKGROUND

System interconnection models describe three layers controlling aspects of data transmission: transaction layer, data link layer, and physical layer. Each layer independently performs tasks to successfully transmit data from a source device to a target device. The transaction layer, for example, may comprise a packet-based protocol to packetize or encapsulate data for transmission. The packet-based protocol sizes the packets of data to optimize transmission through several network devices. The data link layer inserts packet sequence numbers and error verification data, such as idle characters, referred to as an idle symbol, and checksums, to verify data integrity during the transmission. Lastly, the physical layer reformats the data to optimize transmission of the data across a physical interconnection, or communication medium, and a physical layer at the target device reassembles the data.

The link layers at the source device and target device maintain data integrity by performing verifications of the data such as disparity and checksum verifications. Disparity verifications monitor a running disparity of a data transmission. For example, an eight bit/ten bit (8 b/10 b) encoding scheme balances the count of logical ones and logical zeros so that the numbers of each are substantially equivalent. When ten bits are sent having more logical ones than logical zeros, a subsequent transmission will have more logical zeros than ones, flipping the running disparity from more logical ones to more logical zeros, or from one heavy or to zero heavy. When ten bits are sent with equal numbers of ones and zeroes, such a symbol is said to have "neutral" disparity. In some situations, a large number of neutral symbols are transmitted between non-neutral symbols so the source link layer artificially inserts idle symbols to flip the disparity. The target link layer constantly monitors the change in disparity. When the disparity changes inappropriately, an error is assumed to have corrupted the data. Similarly, in checksum verifications, a source device incorporates data, called a checksum, into a data transmission comprising a summation of logical zeros and/or logical ones. The target device's link layer receives the checksum and compares it to a summation maintained by the target device. When the summations do not match, an error is assumed to have occurred in the data transmitted since the last checksum. In response, the target device may either request a retransmission of the data since the last checksum or simply discard the received data.

The number of idle symbols for disparity checks or checksums inserted into the data stream affects the bandwidth of the communication medium and the latency of the data transmission. The bandwidth of a communication medium is a measure of the amount of data that can transmit between a source device and a target device via a communication medium. The latency of a data transmission across that medium is a measure of the average amount of time that elapses between requesting the transmission of data at the source device and verification of the data by the target device, allowing the target device to use the data, and is adversely affected when error verification data is not transmitted often enough. Link layers typically insert error verification data at a fixed frequency or transaction layers embed the data directly into the packets. However, transmitting the error verification data at a fixed frequency or embedding the error verification data into the packets does not take into account the link loading that determines the amount of time it takes for the receiving link layer to verify and use data transmitted. Thus, the fixed frequency or embedded data may be sent too often, such as when the link is heavily loaded, severely impacting the link bandwidth. On the other hand, link integrity information may not be sent often enough in some cases when the link is lightly loaded. This adversely affects latency.

BRIEF FIGURE DESCRIPTIONS

In the accompanying drawings, like references may indicate similar elements:

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated for the present invention are too numerous to discuss individually so the detailed descriptions below are designed to make such embodiments obvious to a person of ordinary skill in the art.

Figure 1:
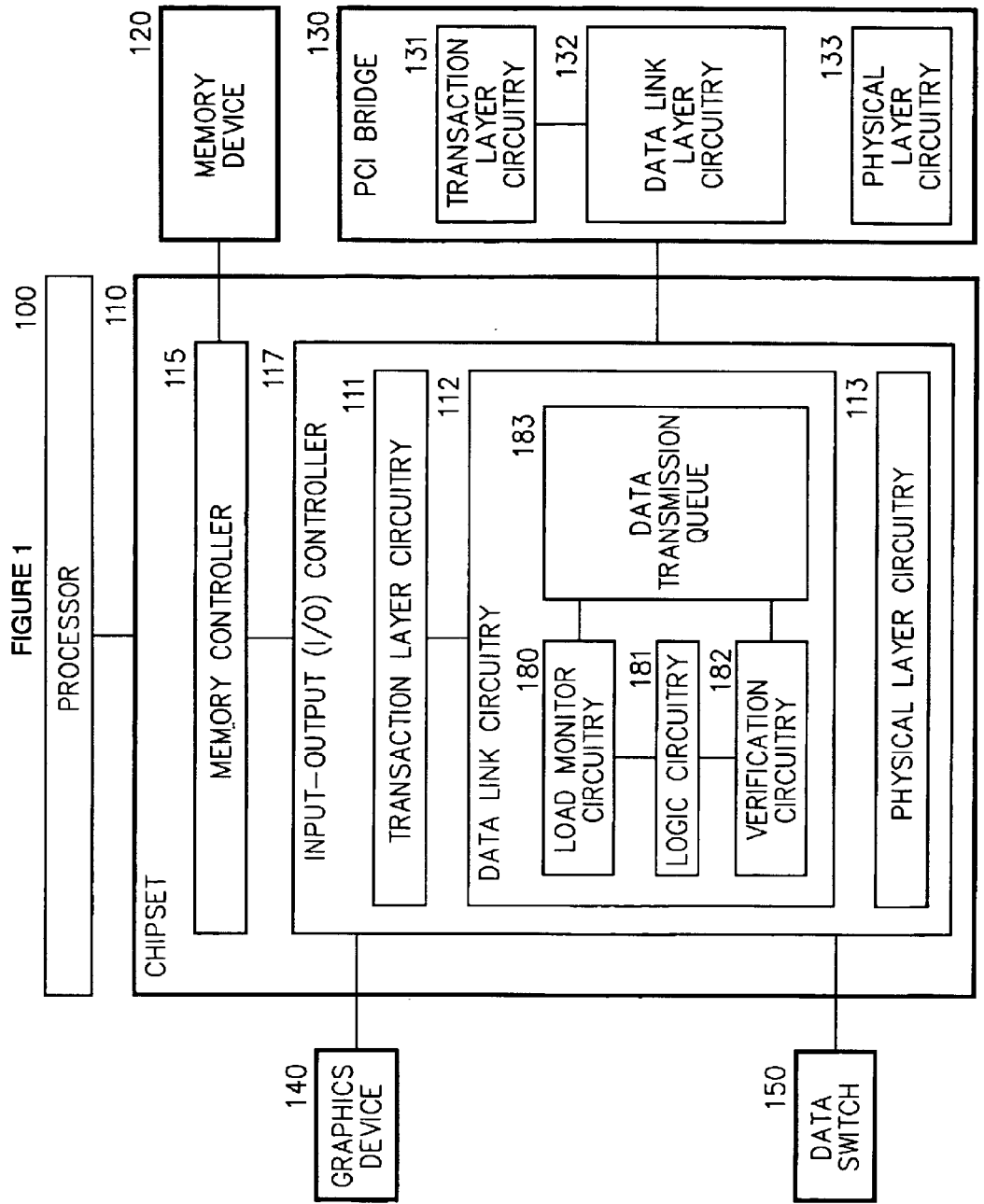
FIG. 1 depicts an embodiment to bound data transmission latency.

Referring now to FIG. 1, there is shown an embodiment to bound data transmission latency based upon a data event, or data transmission event. The embodiment may be a computer system such as a system for a desktop personal computer, notebook computer and/or server. The illustrated embodiment may comprise a processor 100, chipset 110, memory device 120, peripheral component interconnect (PCI) bridge 130, graphics device 140, and data switch 150. Processor 100 may execute instructions in response to requests from operating system software and application software. Processor 100 may be coupled to chipset 110 to access the contents of memory in memory device 120 and receive data from or transmit data to PCI bridge 130, graphics device 140, and data switch 150.

Chipset 110 may access memory contents of memory device 120 and relay data and code between processor 100 and input and output (I/O) devices, such as PCI bridge 130, graphics device 140, and data switch 150. Chipset 110 may comprise a memory controller 115 and an input-output controller (I/O controller) 117. Memory controller 115 may be coupled to memory device 120, to access memory contents of memory device 120 in response to instructions from I/O devices and/or processor 100.

I/O controller 117 may be coupled to graphics device 140 to provide a dedicated high-speed port for a graphics controller. This coupling may be accomplished via transaction layer circuitry 111 that uses a packet-based protocol, data link layer circuitry 112 to verify data integrity, and physical layer circuitry 113 to move data across a communication medium. Transaction layer circuitry 111 may encapsulate data for transmission to graphics device 140 and a packet may comprise a header and data. Data link layer circuitry 112 of chipset 110 may couple to the transaction layer circuitry 111 to associate data events such as the transmission of the last unit of data, such as a byte, word, or double word, of a packet across the communication medium between I/O controller 117 and graphics device 140. Frequent reference is made here in to transmissions between I/O controller 117 and graphics device 140. It should be understood, however, that embodiments may encompass transmissions between any two devices with a transaction layer, data link layer, and physical layer.

In some embodiments, the data link layer circuitry 112 may add a packet sequence number to the packet and add error verification data to the data transmission after the last byte, word, or d-word of the packet may be transmitted from the I/O controller 117 to the graphics device 140. The packet sequence number and error verification data may facilitate the identification of errors in the data transmission by link layer circuitry of graphics device 140. In some embodiments, graphics device 140 may wait for the error verification data before releasing data of the data transmission for use.

The data link layer circuitry 112 may comprise circuitry to determine a point during a data transmission to transmit error verification data based upon loading of the link, or communication medium. For example, the circuitry may comprise load monitor circuitry 180, logic circuitry 181, and verification circuitry 182. Load monitor circuitry 180 may monitor the amount of data enqueued for transmission to the target device along with the amount of data recently transmitted to the target device and base a determination of link loading upon the amount of data waiting to be transmitted to graphics device 140 from I/O controller 117 and the recent history of data transmission between the two agents. In some embodiments, load monitor circuitry 180 may comprise queue fullness circuitry to base a determination of loading on the amount of data in or being received by a data transmission queue 183. For instance, queue fullness circuitry may monitor the amount of data being received by the data transmission queue 183 and the amount of data transmitted via a communication medium to graphics device 140. In other embodiments, queue fullness circuitry may monitor the used and/or unused memory locations of the data transmission queue 183 to determine loading of the link between I/O controller 117 and graphics device 140.

Logic circuitry 181 may determine a point during a data transmission to transmit error verification data, based upon the loading according to the load monitor circuitry 180. In some embodiments, logic circuitry 181 may comprise target number reference circuitry, selection circuitry, transmitted data circuitry, and comparator circuitry. The target number reference circuitry may comprise data or a state machine to correlate a loading of the link, or channel, with a target for inserting error verification data. In some embodiments, target number reference circuitry may comprise a target for inserting idle symbols to cause an artificial disparity transition during a data transmission and/or a target for inserting a checksum. In many of these embodiments, the target number reference circuitry may comprise a number of data units to transmit between transmissions of error verification data, wherein the number of data units is based upon the loading of the link between I/O controller 117 and graphics device 140.

When the target number reference circuitry comprises data rather than a state machine, the logic circuitry 181 may comprise selection circuitry, such as a multiplexer, to select the data based upon the loading. The transmitted data circuitry may monitor or keep track of the amount of data transmitted from data transmission queue 183 to physical layer circuitry 113. In some embodiments, transmitted data circuitry may comprise a transmitted data counter to count data units as the data units are removed from data transmission queue 183. Logic circuitry 181 may further comprise comparator circuitry to compare the target for insertion of error verification data against the amount of data transmitted and to output a signal to the verification circuitry 182 to indicate when the verification circuitry may transmit the error verification data. In some embodiments, logic circuitry 181 may comprise selection circuitry coupled with the comparator circuitry to select a point during the data transmission to transmit error verification data, such as a byte or a d-word, wherein the point may be based upon the association of a word in the data transmission with the last word or byte of data such as a packet. In many of these embodiments, the logic circuitry 181 may receive a signal or indication from transaction layer circuitry 111 regarding appropriate locations in a data transmission to transmit error verification data.

The verification circuitry 182 may have circuitry to select or generate error verification data to transmit in or with the data transmission from I/O controller 117 to graphics device 140. In some embodiments, the circuitry to select or generate error verification data may comprise checksum circuitry to generate a checksum, disparity circuitry to monitor the disparity of the data transmission and to select or generate an idle symbol to transmit in the data transmission, or circuitry for both. The verification circuitry 182 may further comprise circuitry to transmit the error verification data in response to a signal from the logic circuitry 181 indicating the point at which the error verification data may be transmitted to graphics device 140.

The physical layer circuitry 113 interconnecting I/O device 117 with graphics device 140 may comprise a link having one or more lanes to transmit and/or receive data. The link may comprise dual-simplex channels implemented as a transmit pair and a receive pair. A data clock of the physical layer circuitry 113 may facilitate an 8 b/10 b-encoding scheme, or similar encoding scheme when data transmissions may be verified with disparity verifications, to maintain a substantially equivalent number of logical ones and logical zeros in the data transmission. In some embodiments, where more than one lane of a communication medium may transmit data from I/O device 117 to graphics device 140, data may be disassembled into groups, such as d-words, to substantially optimize data transmission across the communication medium with the 8 b/10 b-encoding scheme. Physical layer circuitry 113 of graphics device 140 may reassemble the data in a manner substantially transparent to the data link layer circuitry 112 and transaction layer circuitry 111.

I/O Controller 117 may provide access to memory controller 115, memory device 120, processor 100, and graphics device 140, for I/O devices coupled with data switch 150 and PCI bridge 130. I/O controller 117 may be coupled with data switch 150 and PCI bridge 130 via transaction layer circuitry 111, data link layer circuitry 112, and physical layer circuitry 113. Further, in some embodiments, I/O controller 117 may comprise circuitry to arbitrate access for data switch 150 and PCI bridge 130 to a primary, or host, I/O bus.

Data switch 150 may be designed to interconnect several endpoint devices, such as I/O devices, with point-to-point connections to chipset 110. In some embodiments, data switch 150 may be designed to provide peer-to-peer communication between the I/O devices coupled with data switch 150, such as a mobile docking station in a gigabit Ethernet card, to avoid increasing the traffic on the primary I/O bus unnecessarily.

PCI bridge 130 may couple a PCI bus to I/O controller 117. For example, more than one agent on the PCI bus coupled with PCI bridge 130 may request a read of memory contents in memory device 120. PCI bridge 130 may accept one of the requests and forward the request to I/O controller 117 via transaction layer circuitry 131, data link layer circuitry 132, and physical layer circuitry 133. The transaction layer circuitry 131 may condition the read request into packets and transmit the packets to the data link layer circuitry 132. The data link layer circuitry 132 may comprise circuitry to determine a point during the data transmission to transmit error verification data, and verification circuitry to generate or select error verification data to transmit at the selected point of the data transmission. After the d-word of data is forwarded to I/O controller 117, the verification circuitry of the data link layer circuitry 132 may transmit the error verification data. I/O controller 117 may verify the data with the error verification data and forward the data to memory controller 115 to perform a read access of memory device 120. In some situations, I/O controller 117 may determine that an error has occurred in the data transmission and may request PCI bridge 130 to retransmit the corresponding data.

In many embodiments, transaction layer circuitry, data link layer circuitry, and/or physical layer circuitry may comprise transaction layer, data link layer, and/or physical layer software to execute on a processor and/or controller, and the circuit paths to be utilized by the software, such as memory storing software instructions and a processor to execute the instructions, may be referred to as transaction layer circuitry, data link layer circuitry, and/or physical layer circuitry. In other embodiments, some portion of the functionality of the layers may be implemented in hardware, wherein circuitry may refer to the software and/or hardware. In still further embodiments, the transaction layer, data link layer, and/or physical layer may be implemented substantially to wholly within hardware.

Figure 2:
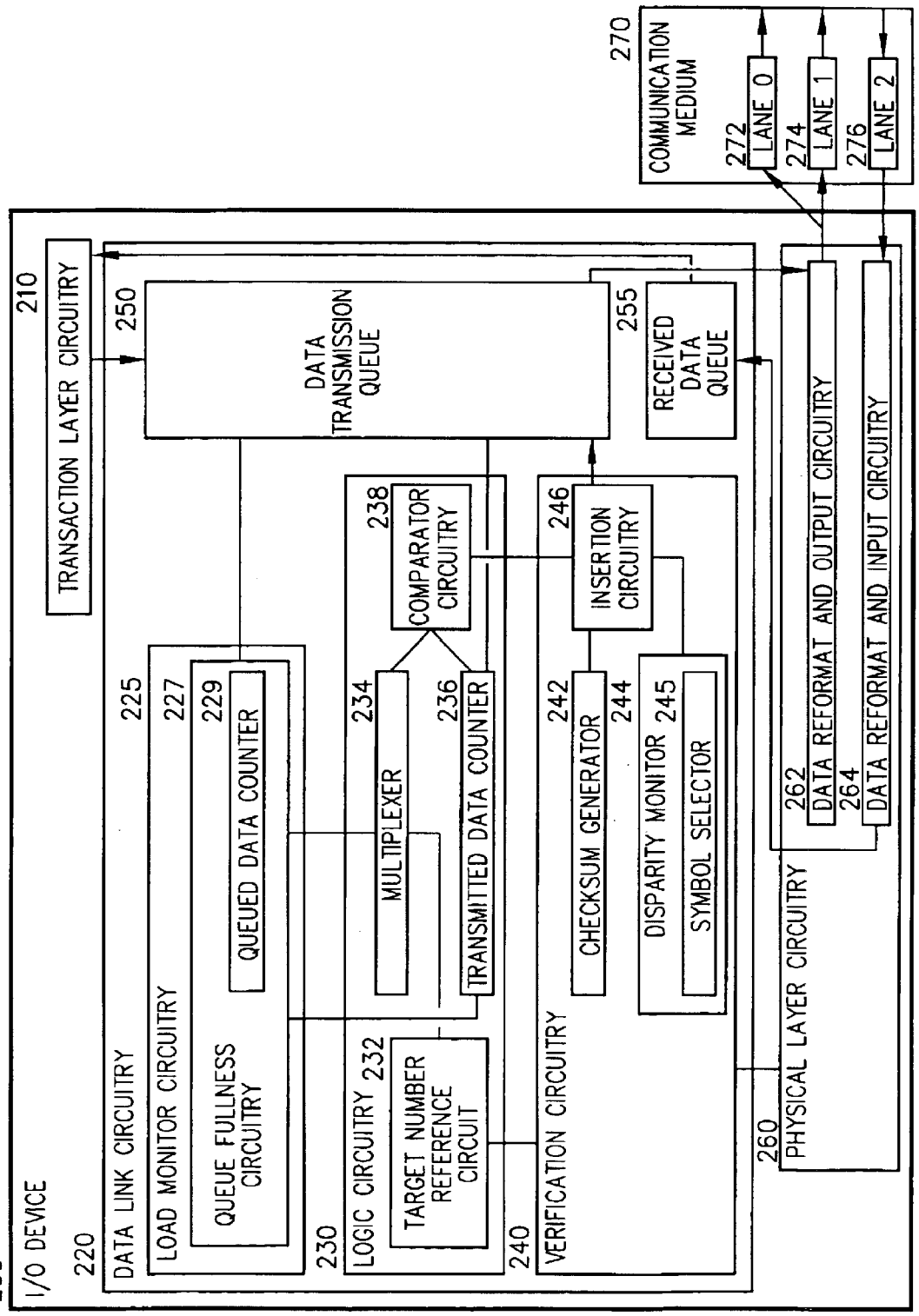
FIG. 2 depicts an embodiment to insert error verification data into a data transmission.

FIG. 2 demonstrates an embodiment to insert error verification data into a data transmission. The embodiment may comprise I/O device 200 coupled to communication medium 270 and may be construed to represent a subsystem present in a chipset, graphics device, PCI bridge, or a data switch. I/O device 200 may comprise transaction layer circuitry 210, data link layer circuitry 220, and physical layer circuitry 260. Transaction layer circuitry 210 may receive read and write requests from a software or hardware application layer and condition the requests into a format for transmission. Transaction layer circuitry 210 may transmit conditioned data, such as packeted data, to data link layer circuitry 220.

In some embodiments, transaction layer circuitry 210 may also receive data transmitted by another device, such as a bridge, switch, hub, or modem, having corresponding physical layer circuitry, link layer circuitry, and transaction layer circuitry. In response, transaction layer circuitry 210 may forward the data to the appropriate product application or function. For instance, the data received may comprise a read request and transaction layer circuitry 210 may forward the read request to a memory controller.

Data link layer circuitry 220 may facilitate the identification of errors during a data transmission across communication medium 270 by inserting error verification data such as checksums and/or idle symbols that provide error detection information or that change the disparity of the data transmission, respectively. Data link layer circuitry 220 may further verify the integrity of a data transmission when data is received by verifying a change in disparity of the data transmission and/or a checksum received with the data transmission.

Data link layer circuitry 220 may comprise load monitor circuitry 225, logic circuitry 230, verification circuitry 240, data transmission queue 250, and received data queue 255. Load monitor circuitry 225 may monitor the loading of a link, or a channel of a link, between I/O device 200 and a target device via lane 272 and lane 274 of communication medium 270. Load monitor circuitry 225 may comprise queue fullness circuitry 227. Queue fullness circuitry 227 may monitor the load on the link by monitoring the fullness of data transmission queue 250. For instance, queue fullness circuitry 227 may monitor the amount of data entering and leaving data transmission queue 250, the amount of data stored in data transmission queue 250, and/or the amount of space available within data transmission queue 250. In some embodiments, queue fullness circuitry 227 may monitor the amount of data and/or space in data transmission queue 250 by monitoring memory locations associated with a first-in pointer and a first-out pointer or may store information about recent queue fullness in order to enable better checksum transmission decisions.

In the present embodiment, queue fullness circuitry 227 may comprise queued data counter 229. Queued data counter 229 may be coupled to data transmission queue 250 to monitor the amount of data received by data transmission queue 250 from transaction layer circuitry 210. Further, queue fullness circuitry 227 may be coupled to transmitted data counter 236 of logic circuitry 230 to monitor the amount of data transmitted from data transmission queue 250 to physical layer circuitry 260.

Logic circuitry 230 may determine a point during a data transmission to transmit or insert error verification data based upon link loading and may be coupled to load monitor circuitry 225 to receive a signal indicating the loading of the link between I/O device 200 and a target device. Logic circuitry 230 may comprise target number reference circuit 232, multiplexer 234, transmitted data counter 236, and comparator 238. Target number reference circuit 232 may comprise several targets for transmitting error verification data in a data transmission across a link, correlated with loadings of the link. In the present embodiment, target number reference circuit 232 may output more than one target number of data units to transmit between transmissions of error verification data, or before the first transmission of error verification data. The target numbers output to multiplexer 234 may vary depending upon the type of error verification data to be transmitted. For example, target number reference circuit 232 may comprise target numbers heuristically-chosen for transmitting idle symbols with non-neutral disparity, such as one byte idle symbols, or target numbers heuristically-chosen for transmitting checksums, such as 4 byte checksums. In the present embodiment, transmitted data counter 236 may be coupled to verification circuitry 240 to receive a signal indicating that a long string of neutral characters may have been transmitted from data transmission queue 250 to physical layer circuitry 260.

Comparator circuitry 238 may compare the point in the data transmission to transmit error verification data against the data transmission to determine a point at which the error verification data may be transmitted. Comparator circuitry 238 may be coupled with multiplexer 234, or other selection circuitry such as standard static complimentary metal oxide semiconductor (CMOS) logic, to receive a target number of data units and compare that target number of data units against the number of unprotected data units that have been transmitted according to transmitted data counter 236, where an unprotected data unit is defined as a data unit that has been transmitted since the last error detection indication. Note that transmitted data counter 236 may count every data symbol as unprotected in a protection scheme that employs checksum-based error monitoring, while transmitted data counter 236 may count only data symbols with neutral disparity under a scheme that employs disparity-based monitoring. Multiplexer 234 may select a target number based upon a loading indicated by a signal received from queue fullness circuitry 227. Transmitted data counter 236 may be coupled with data transmission queue 250 and may be conditioned by a signal from verification circuitry 240 to determine the number of unprotected data units transmitted from data transmission queue 250 to a target device via physical layer circuitry 260 and communication medium 270. In some embodiments, comparator circuitry 238 may output a signal to reset transmitted data counter 236. In other embodiments, verification circuitry 240 may also output a signal that resets transmitted data counter 236. In many embodiments, the reset signal may be the same output transmitted to verification circuitry 240 to indicate that error verification data may transmit in the data transmission or along with the data transmission.

In alternative embodiments, the functions of target number reference circuit 232 and multiplexer 234 may be combined in a state machine. The state machine may comprise a target, such as a target number, to output in response to a signal indicating the loading of the link between I/O device 200 and a target device. In many of these embodiments, the state machine may also perform the function of the comparator and/or transmitted data counter. In still further embodiments, logic circuitry 230 may comprise selection circuitry to determine a convenient point, or location, in a data stream to insert or transmit error verification data based upon a signal or other indication from transaction layer circuitry 210.

Verification circuitry 240 may generate or select error verification data to transmit in or with the data transmission to the target device. In many embodiments, verification circuitry 240 may comprise circuitry to generate an idle symbol based upon the running disparity of a data transmission and/or checksum circuitry to generate a checksum based upon the data transmitted since a previous checksum was inserted into the data transmission. Verification circuitry 240 may comprise checksum generator 242, disparity monitor 244, and insertion circuitry 246. Checksum generator 242 may generate or select a number based upon data transmitted from data transmission queue 250 to physical layer circuitry 260. In some embodiments, checksum generator 242 may generate a number based upon the number of, or a selected number of, logical ones and/or logical zeros transmitted within the data transmission. In some embodiments, verification circuitry 240 may further comprise circuitry to output a signal to logical circuitry 230 when a series of neutral characters are being transmitted from data transmission queue 250.

Disparity monitor 244 may monitor the running disparity of the data transmission from data transmission queue 250 and output error verification data to cause a transition in the disparity of the data transmission. In the present embodiment, disparity monitor 244 comprises symbol selector 245. Symbol selector 245 may comprise one or more logical one heavy idle symbols and one or more logical zero heavy idle symbols such that the symbol selector 245 may output an idle symbol to flip, or cause a transition in, the disparity of the data transmission.

Insertion circuitry 246 may receive a signal from comparator circuitry 238 indicating when error verification data may be transmitted; an output from checksum generator 242 comprising a checksum; and an idle symbol from disparity monitor 244 to output error verification data at a point during a data transmission. Insertion circuitry 246 may output the error verification data to a location in data transmission queue 250 to insert the error verification data at the point in a data transmission associated with that location. In some embodiments, insertion circuitry 246 may insert a checksum into the data transmission rather than an idle symbol when a long series of neutral-disparity symbols may transmit from data transmission queue 250.

In alternative embodiments, verification circuitry 240 may comprise a checksum generator such as checksum generator 242 and insert a checksum into data transmission queue 250 in response to a signal from comparator circuitry 238 indicating that the checksum may be inserted into the data transmission. In still further embodiments, verification circuitry 240 may comprise a disparity monitor 244 and insertion circuitry 246 to insert idle symbols in response to a signal from comparator circuitry 238. Both checksums and idle symbols may, in some embodiments, be transferred directly from verification circuitry 240 to physical layer circuitry 260 without first being placed in data transmission queue 250.

Data transmission queue 250 may comprise memory to store data such as one or more packets until the data can be transmitted across communication medium 270. In many embodiments, data transmission queue 250 may be a serial, first-in, first-out data transmission queue having pointers to indicate the first unit of data received and the last unit of data received. In some embodiments, data transmission queue 250 may also comprise a unit of memory to store error verification data to insert into the data transmission. In other embodiments, data transmission queue 250 may allow random access to pieces of the stream received from transaction layer circuitry 210.

In some embodiments, data link layer circuitry 220 may also comprise received data queue 255 to verify the integrity of data received via communication medium 270. Received data queue 255 may store data to transmit to transaction layer circuitry 210. In some situations where transaction layer circuitry 210 stalls, or is otherwise unable to process the data received, received data queue 255 may become full. In many of these embodiments, verification circuitry 240 may further comprise circuitry to monitor the disparity of the data received by the received data queue 255 and/or circuitry to maintain a checksum of the data received in received data queue 255. When verification circuitry 240 maintains a checksum, the checksum may be compared to data received that is identifiable as error verification data. After the checksum determined by verification circuitry 240 matches the checksum of the error verification data, the corresponding data of the data transmission may be verified.

In other situations, the checksum generated by a verification circuitry 240 may not match the error verification data received by the received data queue 255 so verification circuitry 240 may initiate a request to retransmit the data since receipt of the last error verification data. For instance, after verification circuitry 240 may receive error verification data that modifies the disparity of the data transmission, verification circuitry 240 may recognize the error verification data as a non-neutral symbol and determine whether the idle symbol caused an appropriate transition in the disparity of the data transmission. After any symbol causes an appropriate transition in the running disparity of the data transmission, verification circuitry 240 may determine that no single-bit error has been encountered in the data transmission. On the other hand, verification circuitry 240 may receive a checksum and may compare the checksum to a checksum generated by verification circuitry 240. After a determination that the checksum generated by verification circuitry 240 may match the checksum received, data link layer circuitry 220 may determine that no errors of the types covered by the chosen checksum algorithm occurred in the data transmissions received by received data queue 255. In several of these embodiments, data received by input/output device 200 via communication medium 270 may not be used or retransmitted until data is verified by verification circuitry 240.

Physical layer circuitry 260 may be coupled to data link layer circuitry 220 to receive data to transmit via communication medium 270 and to forward data received via communication medium 270. Physical layer circuitry 260 may comprise data reformat and output circuitry 262 and data reformat and input circuitry 264. Data reformat and output circuitry 262 may be coupled to data transmission queue 250 of the data link layer circuitry 220 to transmit data from data transmission queue 250 along with error verification data to a target device having a corresponding physical layer circuitry, or the equivalent, coupled to communication medium 270. Data reformat and output circuitry 262 may transmit data via lane 272 and lane 274 of communication medium 270, and receive data via lane 276 of communication medium 270. In situations where data reformat and output circuitry 262 may transmit data via more than one lane of a communication medium, data reformat and output circuitry 262 may modify the format of the data from data transmission queue 250 to take advantage of the bandwidth available on communication medium 270. For example, data transmission queue 250 may comprise a 4-byte wide queue and data reformat and output circuitry 262 may comprise an 8 b/10 b-encoding scheme to transmit data across lane 272 and lane 274. Data reformat and output circuitry 262 may forward byte 1 to lane 272, byte 2 to lane 274, byte 3 to lane 272, and then byte 4 to lane 274 to encode the bytes and transmit the data serially across lane 272 and lane 274.

Data reformat and input circuitry 264 may receive a serial transmission of data via lane 276 of communication medium 270. Data reformat and input circuitry 264 may receive data encoded by a physical layer circuitry at a source device that encoded the data with an 8 b/10 b-encoding scheme and transmitted the data serially via lane 276. Data reformat and input circuitry 264 may reassemble the data into 4-byte wide units and transmit the data to received data queue 255.

In alternative embodiments, physical layer circuitry 260 may be able to select a number of lanes available to transmit data via communication medium 270 and a source device may be able to select a number of lanes to transmit data to input/output device 200 via communication medium 270. For example, when lane 272, lane 274, and lane 276 are idle, I/O device 200 may claim lane 272, lane 274, and lane 276 to transmit data to a target device. Physical layer circuitry 260 may disassemble data units of data transmission queue 250 to optimize or substantially optimize the use of lane 272, lane 274, and lane 276. In other embodiments, one lane of a communication medium such as lane 272 may be dedicated to transmit data from I/O device 200 to another device and lane 276 may be dedicated to transmit data from the other device to I/O device 200. In many of these embodiments, lane 274 may be selected by I/O device 200 to transmit data to the other device when the back log of data to transmit to the other device may be greater than the backlog of data to transmit from the other device to I/O device 200.

Figure 3:
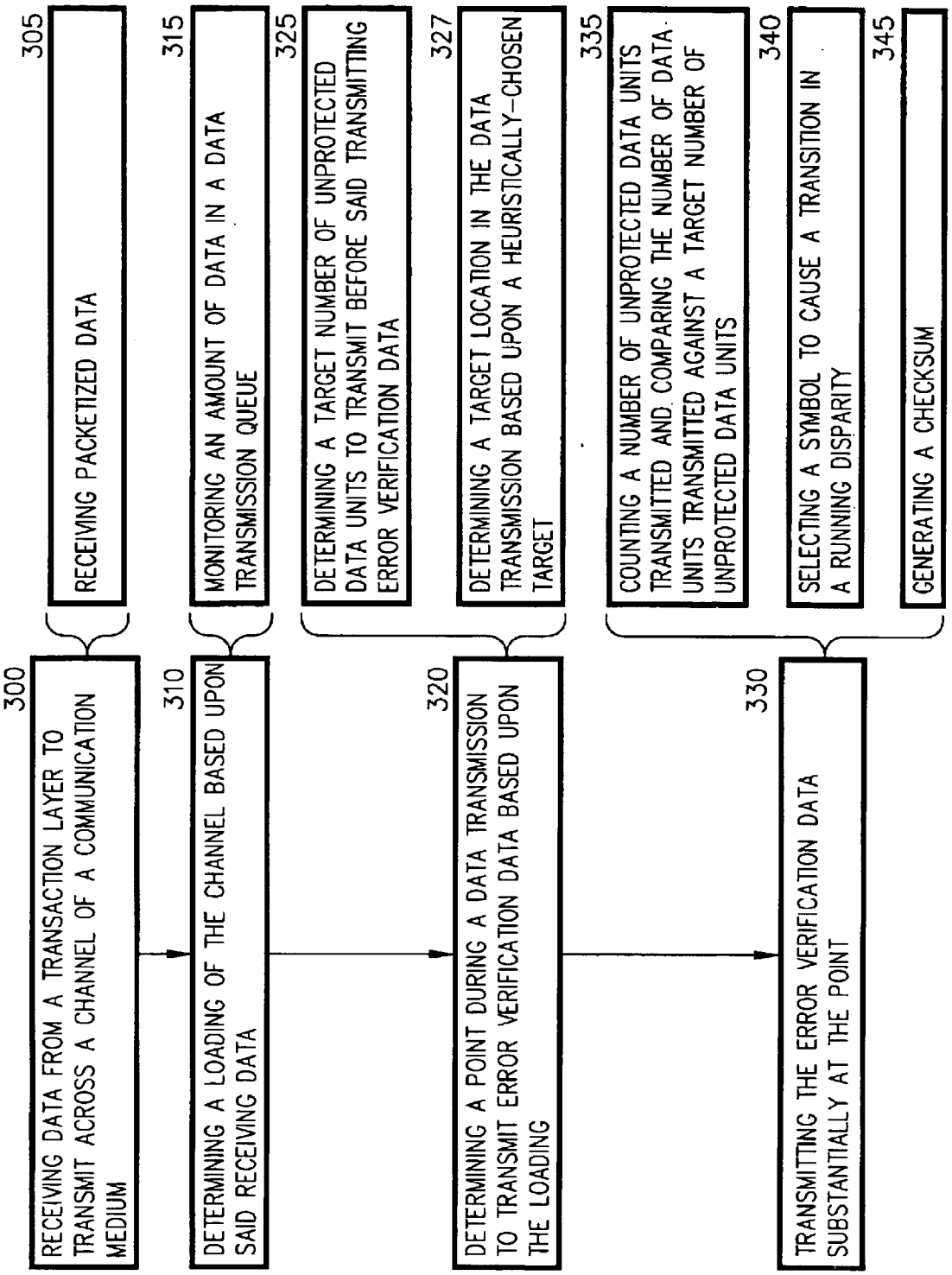
FIG. 3 depicts a flow chart of embodiments to bound data transmission latency.

Referring now to FIG. 3, there is shown a flow chart of an embodiment to bound the latency of a data transmission. The embodiment comprises receiving data from a transaction layer to transmit across a channel of a communication medium 300, determining a loading of the channel based upon said receiving data 310, determining a point during a data transmission to transmit error verification data based upon the loading 320, and transmitting the error verification data substantially at the point 330. Receiving data from a transaction layer to transmit across a channel of a communication medium 300 may receive data, such as packeted data, from the transaction layer that is formatted according to a format of a transaction protocol in the transaction layer. Receiving data from a transaction layer to transmit across a channel of a communication medium 300 may comprise receiving packetized data 305. Receiving packetized data 305 may comprise receiving data via a packet based transaction protocol in the transaction layer and storing the data in a data transmission queue. In some embodiments, receiving packetized data 305 may comprise storing a bit or bits in a memory location in the data transmission queue associated with the packeted data or storing the bit or bits with the packeted data in the data transmission queue. For instance, the bit or bits may represent a packet sequence number. In many of these embodiments, receiving packetized data 305 may comprise queuing a packet comprising data and a header.

Determining a loading of the channel based upon said receiving data 310 may determine the loading, or level of loading, of one or more channels coupling the data link layer of a source device to the data link layer of a target device. Determining a loading of the channel based upon said receiving data 310 may comprise monitoring an amount of data in a data transmission queue 315. Monitoring an amount of data in a data transmission queue 315 may comprise determining a difference between the amount of data received by the data transmission queue and the amount of data transmitted out of the data transmission queue. In other embodiments, monitoring an amount of data in a data transmission queue 315 may comprise monitoring the difference between the physical address or logical address in the data transmission queue associated with a first end pointer and the data location associated with a last end pointer. In still further embodiments, monitoring an amount of data in a data transmission queue 315 may comprise monitoring the amount of data in the data transmission queue or monitoring the amount of space available in the transmission queue.

Determining a point during a data transmission to transmit error verification data based upon the loading 320 may determine the number of data units to transmit between transmissions of error verification data and count the number of data units transmitted from the data transmission queue, to determine the point or when the point may match or be near the target. Determining a point during a data transmission to transmit error verification data based upon the loading 320 may comprise determining a target number of unprotected data units to transmit before said transmitting error verification data 325 and determining a target location in the data transmission based upon a heuristically-chosen target 327. Determining a target number of unprotected data units to transmit before said transmitting error verification data 325 may comprise selecting a target number of data units based upon a formula or algorithm correlating a target number of unprotected data units with the loading of the channel or a level of loading of the channel. In some embodiments, the formula or algorithm may be in the form of a chart associating a load or level of loading with a target number of data units to transmit between transmissions of error verification data. Several of these embodiments may comprise multiplexing between more than one target number with a selection signal based upon the loading of the channel. Determining a target location in the data transmission based upon a heuristically-chosen target 327 may comprise determining a target location based upon data, formula, and/or algorithm by loading the link, a similar link, or simulating load on a link. In some embodiments, the heuristically-chosen targets may be default values that may be refined during use. In other embodiments, the heuristically-chosen targets may be determined by experimentation and incorporated into logic circuitry.

Transmitting the error verification data substantially at the point 330 may transmit error verification data, such as a checksum or an idle symbol, within or along with the data transmission after receiving an indication that the point in the data transmission to transmit the error verification data is near or has been reached. In some embodiments, transmitting may comprise forcing error verification data into a data transmission at the point. Transmitting the error verification data substantially at the point 330 may comprise counting number of unprotected data units transmitted and comparing the number of data units transmitted against a target number of unprotected data units 335; selecting a symbol to cause a transition in the running disparity 340; generating a checksum 345; and inserting error verification data at an end of a packet. Counting the number of data units transmitted and comparing the number of unprotected data units transmitted against a target number of unprotected data units 335 may compare the target number of unprotected data units, such as the number of bytes, words, or d-words, against the number of bytes, words, or d-words transmitted from the data transmission queue since the last piece of error verification data may have been sent. Once the comparison determines that the number of unprotected data units transmitted is near or at the target number of unprotected data units, transmitting the error verification data substantially at the point 330 may comprise outputting a signal indicating that the error verification data may transmit. Outputting a signal indicating that the error verification data may transmit may cause insertion of error verification data into the data transmission queue to transmit to a target device via the physical layer.

Selecting a symbol to cause a transition in a running disparity 340 may comprise monitoring the running disparity of a data transmission and attaching the idle symbol to the data of the data transmission. Generating a checksum 345 may comprise determining a combination of logical ones and zeros to represent data transmitted since the beginning of the data transmission or since the last error verification data or checksum transmission. In some embodiments, generating a checksum 345 may comprise generating a number based upon a number of logical ones and/or logical zeros transmitted.

Inserting error verification data at an end of a packet may insert the error verification data at an end of a packet, such as before the first byte of a packet or after the last byte of a packet, at or near the point selected during the data transmission to transmit error verification data based upon the loading. In some embodiments, inserting error verification data at an end of a packet may comprise inserting a checksum or an idle symbol into the data transmission queue such that the checksum or idle symbol is transmitted near an end of a packet.

Figure 4:
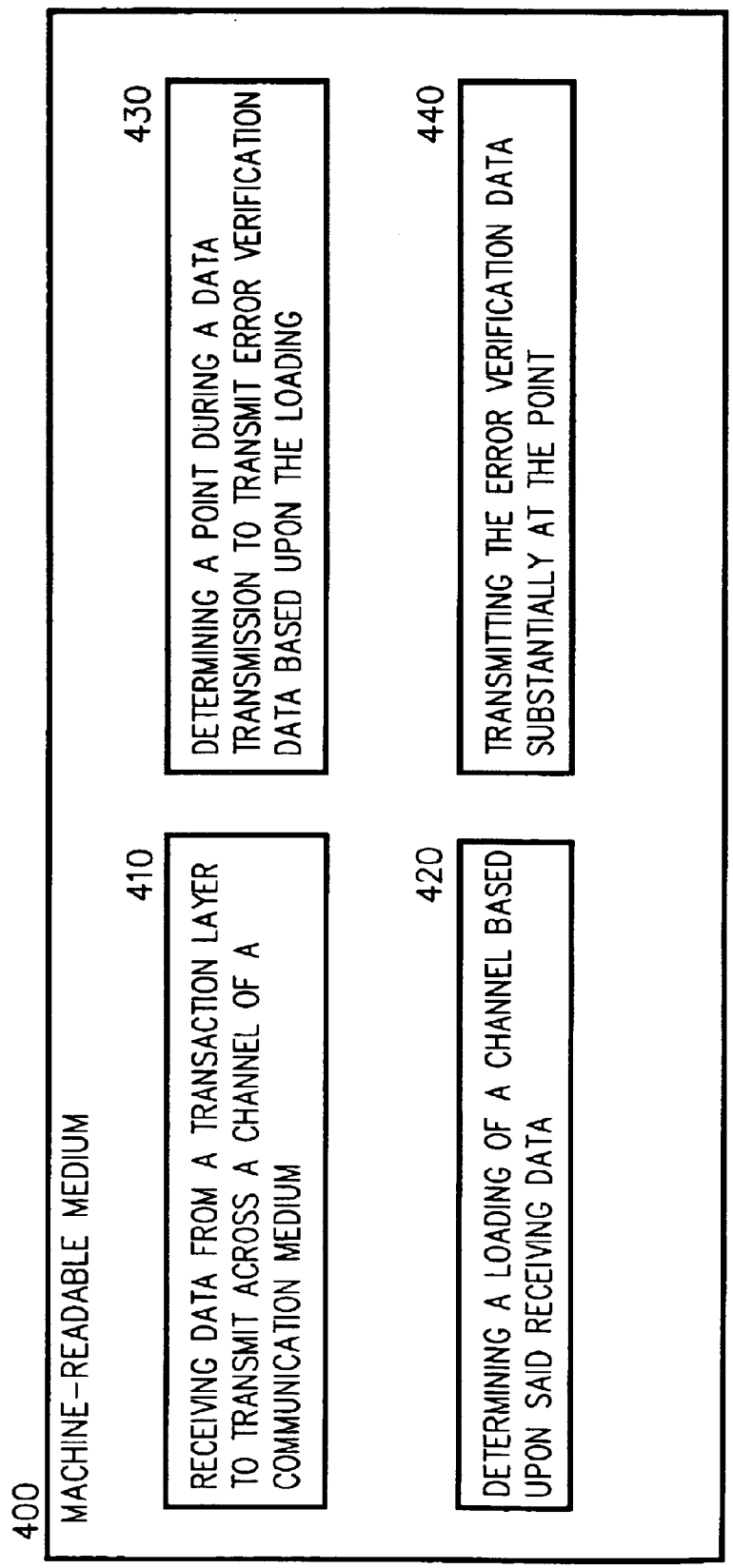
FIG. 4 depicts an embodiment of a machine-readable medium comprising instructions to bound data transmission latency.

Referring now to FIG. 4, a machine-readable medium embodiment of the present invention is shown. A machine-readable medium includes any mechanism that provides (i.e. stores and or transmits) information in a form readable by a machine (e.g., a computer), that when executed by the machine, may perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc. . . . Several embodiments of the present invention may comprise more than one machine-readable medium depending on the design of the machine.

In particular, FIG. 4 shows an embodiment of a machine-readable medium comprising instructions to bound data transmission latency. The machine-readable medium 400 may comprise instructions for receiving data from a transaction layer to transmit across a channel of a communication medium 410, determining a loading of the channel based upon said receiving data 420, determining a point during a data transmission to transmit error verification data based upon the loading 430, and transmitting the error verification data substantially at the point 440. Receiving data from a transaction layer to transmit across a channel of a communication medium 410 may comprise receiving packetized data from a packet-based transaction layer protocol. In some embodiments, receiving data from a transaction layer to transmit across a channel of a communication medium 410 may comprise instructions for queuing packeted data and attaching a packet sequence number to the packeted data. In alternate embodiments, receiving data from a transaction layer to transmit across a channel of a communication medium 410 may comprise receiving a stream of data in intervals, wherein each interval may be a point during the data transmission available to insert error verification data.

Determining a loading of the channel based upon said receiving data 420 may comprise instructions for determining the loading of the channel of the communication medium. For example, the communication medium may have selectable lanes for transmitting data from a source device to a target device and determining a loading of the channel based upon said receiving data 420 may determine the loading based upon the number channels available to transmit data across the communication medium from the source to the target device. Determining a loading of the channel based upon said receiving data 420 may also comprise instructions for monitoring the amount of data in a data transmission queue. Monitoring the amount of data in a data transmission queue may comprise instructions for generating a signal to represent a backlog of data in the data transmission queue.

Determining a point during a data transmission to transmit error verification data based upon the loading 430 may comprise instructions for determining a frequency to transmit error verification data based upon the loading of a link between a source device and a target device. The instructions for determining the frequency may comprise instructions for determining the frequency based upon the current backlog of data in the data transmission queue and instructions to dynamically modify the frequency as the backlog of data changes. In some embodiments, determining a point during a data transmission to transmit error verification data based upon the loading 430 may comprise instructions for determining a target number of data units to transmit between transmission of error verification data. In many of these embodiments, instructions for determining a target number of data units to transmit between transmissions of error verification data may comprise instructions for determining the target number of data units based upon heuristically-chosen targets. Determining the target number of data units based upon heuristically-chosen targets may comprise instructions for determining a target number of data units from a formula or algorithm, or data correlating target numbers with loading or levels of loading of the channels.

Transmitting the error verification data substantially at the point 440 may comprise instructions for transmitting error verification data, such as a checksum or an idle symbol, to facilitate verification of the data transmission by a link layer at the target device. Transmitting the error verification data substantially at the point 440 may also comprise instructions for transmitting error verification at an interval in the data stream available to transmit error verification data or at, or near, an end of a packet, such as the front end of a packet or the back end of a packet. In further embodiments, transmitting the error verification data substantially at the point 440 may comprise transmitting error verification data substantially at a frequency selected for transmitting error verification data based upon the loading of the communication medium, such as the channel(s), or link.

What is claimed is:

1. An apparatus, comprising:
    a queue to receive data from a transaction layer to transmit across a channel of a communication medium;
    load monitor circuitry coupled with said queue to determine a loading of the channel;
    logic circuitry coupled with said load monitor circuitry to determine a point during a data transmission to transmit error verification data based upon the loading; and
    verification circuitry coupled with said logic circuitry, to transmit the error verification data near the point;
    wherein said load monitor circuitry comprises queue fullness circuitry to monitor an amount of data in said queue.

2. The apparatus of claim 1, further comprising physical layer circuitry coupled with the data transmission queue, to transmit data across the communication medium.

3. The apparatus of claim 1, wherein said queue comprises a first-in, first-out queue.

4. The apparatus of claim 1, wherein said queue comprises a random-access data storage queue.

5. The apparatus of claim 1, wherein the queue fullness circuitry comprises a counter coupled with said verification circuitry, to count data units received by said queue.

6. The apparatus of claim 1, wherein said logic circuitry comprises:
    a counter coupled with said queue to count data units to transmit;
    a multiplexer to select a target number of data units; and
    a comparator coupled with the counter to compare the count of unprotected data units against the target number of data units to be selected by the multiplexer.

7. The apparatus of claim 1, wherein said logic circuitry comprises circuitry to select the point during the data transmission based upon a heuristically-chosen target.

8. The apparatus of claim 1, wherein said logic circuitry comprises circuitry to determine a number of unprotected data units to transmit between transmissions of error verification data.

9. The apparatus of claim 1, wherein said verification circuitry comprises circuitry to generate a checksum.

10. The apparatus of claim 9, wherein said verification circuitry comprises circuitry to transmit the checksum.

11. The apparatus of claim 1, wherein said verification circuitry comprises circuitry to monitor a running disparity of the data transmission.

12. The apparatus of claim 11, wherein said verification circuitry comprises circuitry to transmit a symbol to cause a transition in the running disparity of the data transmission.

13. A method, comprising:
    receiving data from a transaction layer to transmit across a channel of a communication medium;
    determining a loading of the channel based upon said receiving data;
    determining a point during a data transmission to transmit error verification data based upon the loading; and
    transmitting the error verification data substantially at the point;
    wherein said receiving comprises receiving packetized data.

14. The method of claim 13, wherein said determining a loading comprises monitoring an amount of data in a data transmission queue.

15. The method of claim 13, wherein said determining a point comprises determining a target number of unprotected data units to transmit before said transmitting error verification data.

16. The method of claim 13, wherein said determining a point comprises determining a target location in the data transmission based upon a heuristically-chosen target.

17. The method of claim 13, wherein said transmitting the error verification data comprises:
    counting a number of unprotected data units transmitted; and
    comparing the number of data units transmitted against a target number of unprotected data units.

18. The method of claim 13, wherein said transmitting the error verification data comprises selecting a symbol to cause a transition in a running disparity.

19. The method of claim 13, wherein said transmitting the error verification data comprises generating a checksum.

20. A system, comprising:
    a memory device;
    a memory controller coupled with said memory device to provide access to memory contents of said memory device; and
    an input-output controller coupled with said memory controller to access the memory contents, comprising
    a queue to receive data from a transaction layer to transmit across a channel of a communication medium;
    load monitor circuitry coupled with said queue to determine a loading of the channel;
    logic circuitry coupled with said load monitor circuitry to determine a point during a data transmission to transmit the error verification data based upon the loading; and
    verification circuitry coupled with the logic circuitry, to transmit the error verification data near the point,
    wherein verification circuitry comprises circuitry to transmit a symbol to cause a transition in a running disparity of the data transmission.

21. The system of claim 20, further comprising a processor coupled with said input-output controller to communicate with an agent coupled with the communication medium.

22. A system, comprising:
- a first input-output device to initiate a request for data via a communication medium;
- a second input-output device coupled with said first input-output device to respond to the request with the data, comprising
- a queue to store data from transaction layer circuitry to transmit across a channel of a communication medium;
- load monitor circuitry coupled with said queue to determine a loading of the channel;
- logic circuitry coupled with said load monitor circuitry to determine a point during a data transmission to transmit error verification data based upon the loading; and
- verification circuitry coupled with the logic circuitry, to transmit error verification data near the point; and
- a processor coupled with said second input-output device to respond to the request for data;
- wherein said second input-output device further comprises a switch to couple a third input-output device with said processor.

23. The system of claim 22, wherein said first input-output device comprises a switch to couple a fourth input-output device with said processor.

24. A machine-readable medium containing instructions, which when executed by a machine, cause said machine to perform operations, comprising:
- receiving data from a transaction layer to transmit across a channel of a communication medium;
- determining a loading of the channel based upon said receiving data;
- determining a point during a data transmission to transmit error verification data based upon the loading; and
- transmitting the error verification data substantially at the point;
- wherein said transmitting the error verification data comprises generating a checksum.

* * * * *